(12) United States Patent
Matsushima et al.

(10) Patent No.: US 10,280,848 B2
(45) Date of Patent: May 7, 2019

(54) INTERNAL COMBUSTION ENGINE CONTROL APPARATUS

(71) Applicant: Mitsubishi Electric Corporation, Tokyo (JP)

(72) Inventors: Yuhei Matsushima, Tokyo (JP); Takahiko Inada, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 734 days.

(21) Appl. No.: 14/640,481

(22) Filed: Mar. 6, 2015

(65) Prior Publication Data

US 2016/0108824 A1 Apr. 21, 2016

(30) Foreign Application Priority Data

Oct. 20, 2014 (JP) .................................. 2014-213378

(51) Int. Cl.
*F02D 13/06* (2006.01)
*F02P 5/04* (2006.01)
(Continued)

(52) U.S. Cl.
CPC .......... *F02D 13/06* (2013.01); *F01L 13/0005* (2013.01); *F02D 37/02* (2013.01); *F02D 41/0087* (2013.01); *F02P 5/045* (2013.01); *F02P 5/1502* (2013.01); *F01L 2001/0537* (2013.01); *F01L 2013/001* (2013.01); *F02D 41/1454* (2013.01); *F02D 41/18* (2013.01); *F02D 2041/0012* (2013.01); *Y02T 10/18* (2013.01); *Y02T 10/46* (2013.01)

(58) Field of Classification Search
CPC ...... F02D 13/06; F02D 41/0087; F02D 37/02; F02D 41/1454; F02D 41/18; F02D 2041/0012; F01L 13/0005; F01L 2001/0537; F01L 2013/001; F01L 1/181; F02P 5/045; F02P 5/1502; Y02T 10/18
USPC ........................ 701/101, 105; 123/344, 198 F
See application file for complete search history.

(56) References Cited

U.S. PATENT DOCUMENTS 9,382,852 B2 * 7/2016 Inada ...................... F02D 17/02
2005/0022755 A1 * 2/2005 Hitomi .................... F01L 1/185
123/58.8

(Continued)

FOREIGN PATENT DOCUMENTS

JP 2009-270492 A 11/2009
JP 2012-92745 A 5/2012

*Primary Examiner* — Stephen K Cronin
*Assistant Examiner* — Susan E Scharpf
(74) *Attorney, Agent, or Firm* — Sughrue Mion, PLLC; Richard C. Turner

(57) ABSTRACT

There is provided an internal combustion engine control apparatus that is capable of determining accurately from an ignition discharging time period whether the intake valve and the exhaust valve are in the operative condition or in the inoperative condition. A cylinder deactivation controller causes a first ignition controller to perform a first ignition control on the basis of the ignition timing when issuing no cylinder deactivation request, and causes a second ignition controller to perform a second ignition control on the basis of an energizing time period when issuing the cylinder deactivation controller. The discharging time period is calculated by a discharging time period calculation section on the basis of an ion current signal output from the ignition coil.

16 Claims, 6 Drawing Sheets

(51) Int. Cl.
    *F02D 41/00*     (2006.01)
    *F02P 5/15*     (2006.01)
    *F01L 13/00*     (2006.01)
    *F02D 37/02*     (2006.01)
    F02D 41/14     (2006.01)
    F02D 41/18     (2006.01)
    F01L 1/053     (2006.01)

(56) References Cited

U.S. PATENT DOCUMENTS

| | | | | |
|---|---|---|---|---|
| 2005/0205037 A1* | 9/2005 | Lewis | ............ | B60W 10/06 |
| | | | | 123/179.16 |
| 2005/0205063 A1* | 9/2005 | Kolmanovsky | ............ | F01L 9/04 |
| | | | | 123/436 |
| 2007/0272202 A1* | 11/2007 | Kuo | ............ | F02D 13/0211 |
| | | | | 123/295 |
| 2009/0204312 A1* | 8/2009 | Moriya | ............ | F01L 1/344 |
| | | | | 701/103 |
| 2009/0222197 A1* | 9/2009 | Moriya | ............ | F01L 1/344 |
| | | | | 701/105 |
| 2011/0239987 A1* | 10/2011 | Maehara | ............ | F01L 1/181 |
| | | | | 123/406.46 |

* cited by examiner

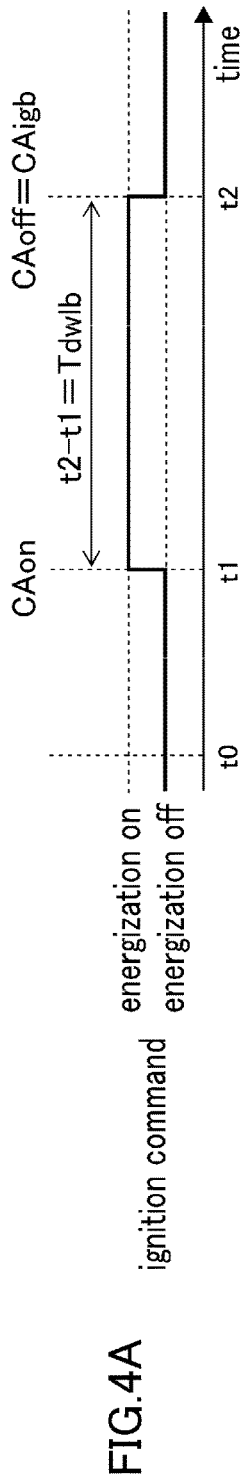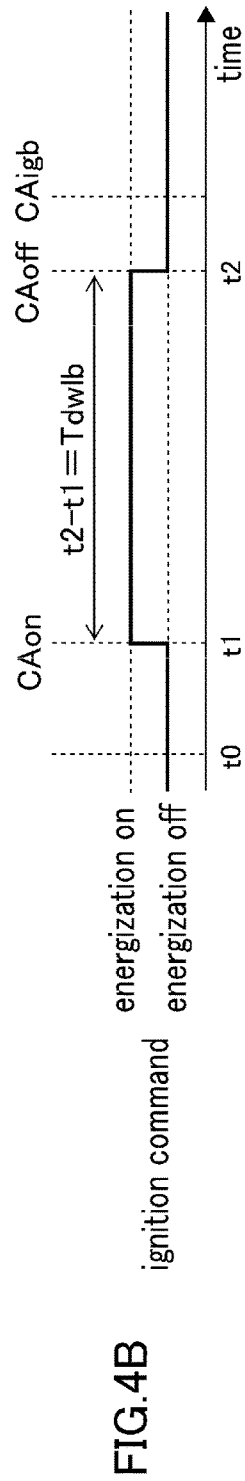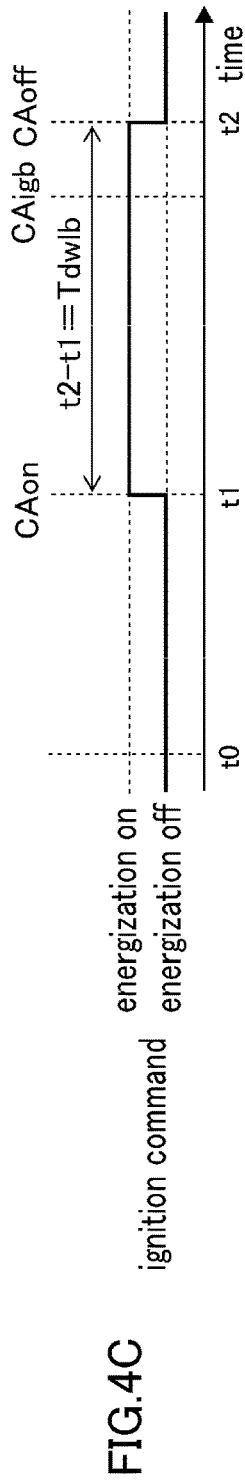

INTERNAL COMBUSTION ENGINE CONTROL APPARATUS

BACKGROUND OF THE INVENTION

1. Field of the Invention

The present invention relates to an internal combustion engine control apparatus that is equipped with a cylinder deactivation control means for activating or deactivating at least one cylinder of the internal combustion engine.

2. Description of the Background

In order to improve fuel economy performance of internal combustion engines, an internal combustion engine has been conventionally known that is equipped with a cylinder deactivation system. The cylinder deactivation system, in response to operating conditions of the internal combustion engine, deactivates operation of part of a plurality of cylinders by putting the intake valve(s) and the exhaust valve(s) into the inoperative condition (valve lift=0) and operates the other cylinders under a high load condition (large throttle opening), to reduce pumping loss.

In the internal combustion engine equipped with the cylinder deactivation system, since various kinds of controls, such as fuel control, airflow control, and torque control, are performed in response to a determination result whether the valves are in the operative or inoperative conditions, the valve condition need to be determined accurately.

There have been proposed technologies of determining the valve condition such as by utilizing presence or absence of the intake-air pulsation, which synchronize with the intake stroke of each cylinder, detected from output of the airflow sensor (see, for example, Patent Document 1) and by utilizing the air-to-fuel ratio of the exhaust gas (see, for example, Patent Document 2).

Patent Document 1: Japanese Application Laid-open No. 2009-270492

Patent Document 2: Japanese Application Laid-open No. 2012-92745

However, when any one of the intake valve and the exhaust valve malfunctions, such conventional technologies have not been capable of determining the condition of the other valve.

SUMMARY OF THE INVENTION

The present invention is made to overcome such a problem as described above and aims at providing an internal combustion engine control apparatus that is capable of determining accurately the valve condition.

An internal combustion engine control apparatus according to the present invention includes a cylinder deactivation control means for activating or deactivating at least one cylinder of an internal combustion engine; a valve operating means) for putting at least any one of an intake valve and an exhaust valve provided in the internal combustion engine into an operative condition or an inoperative condition on the basis of an request from the cylinder deactivation control means; an ignition control means for energizing an ignition coil provided in the internal combustion engine on the basis of a predetermined ignition timing and a predetermined energizing time period, to cause an ignition plug disposed on a combustion chamber of the internal combustion engine to discharge an ignition spark; a discharging time period calculation means for calculating an ignition discharging time period that is dwell time of the ignition discharge; a valve condition determination means for determining an operating condition of at least any one of the intake valve and the exhaust valve on the basis of the ignition discharging time period calculated by the discharging time calculation means), wherein the ignition control means includes a first ignition control means) for causing the ignition plug to discharge an ignition spark on the basis of the ignition timing when the cylinder deactivation control means issues no cylinder deactivation request and a second ignition control means for causing the ignition plug to discharge an ignition spark on the basis of the energizing time period when the cylinder deactivation control means issues a cylinder deactivation request.

According to the present invention, an internal combustion engine control apparatus can be provided that is capable of determining accurately a valve condition by optimizing an ignition control for determining the valve condition.

BRIEF DESCRIPTION OF THE DRAWINGS

FIG. 4A is timing charts for explaining operation of a second ignition control means of the internal combustion engine control apparatus according to Embodiment 1 of the present invention;

FIG. 4B is timing charts for explaining operation of a second ignition control means of the internal combustion engine control apparatus according to Embodiment 1 of the present invention;

FIG. 4C is timing charts for explaining operation of a second ignition control means of the internal combustion engine control apparatus according to Embodiment 1 of the present invention;

DETAILED DESCRIPTION OF THE INVENTION

The present inventors focused attention on the fact that there is a difference in pressure and stream in the combustion chamber between situations under an operative and an inoperative conditions of the valve and experimentally found that the difference is correlated with the condition of ignition discharge by the ignition plug disposed on the combustion chamber. Then, the present inventors will now propose a technology of determining the valve condition using parameters associated with the ignition discharge conditions.

In the technology of determining the valve condition using the parameters associated with the discharge conditions of the ignition plug, the ignition coil must be energized in a proper manner (ignition control). Ordinarily, in an ignition control for igniting mixture gas, in order to achieve optimum output performance and combustion efficiency of an internal combustion engine, the ignition coil is energized on the basis of ignition timing. For that reason, a time period of energizing the ignition coil, i.e., energy imparted to the ignition plug varies when operating conditions (for example, revolution speed) of the internal combustion engine vary. Thus, change of the ignition discharging condition raises a problem in that the valve condition cannot be determined accurately. While in the ordinary ignition control, the energizing time period is set so that the mixture gas is reliably ignited in a high pressure state around the compression top dead center (TDC), using the ignition energizing time period without modification for determination of the valve condition moreover poses a problem in deterioration of the ignition coil and the ignition plug.

Embodiment 1

The present inventors examined a means for solving the above-described problems and focused attention on the fact that there is a difference in pressure and stream in the combustion chamber between situations under an operative and an inoperative conditions of the valve in an internal combustion engine equipped with a cylinder deactivation system. Consequently, it was found experimentally that the difference is correlated with the ignition discharging time period, i.e., discharge conditions of the ignition plug disposed on the combustion chamber (see FIG. 6A to FIG. 6C).

Figure 6A:
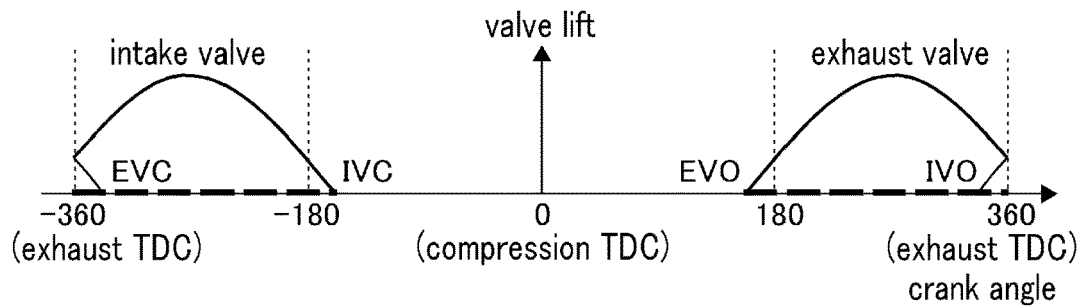
FIG. 6A is graphs for explaining characteristics of the valve lift, combustion chamber pressure, and the ignition discharging time period with respect to crank angles under each valve condition, according to Embodiment 1 of the present invention.
Figure 6B:
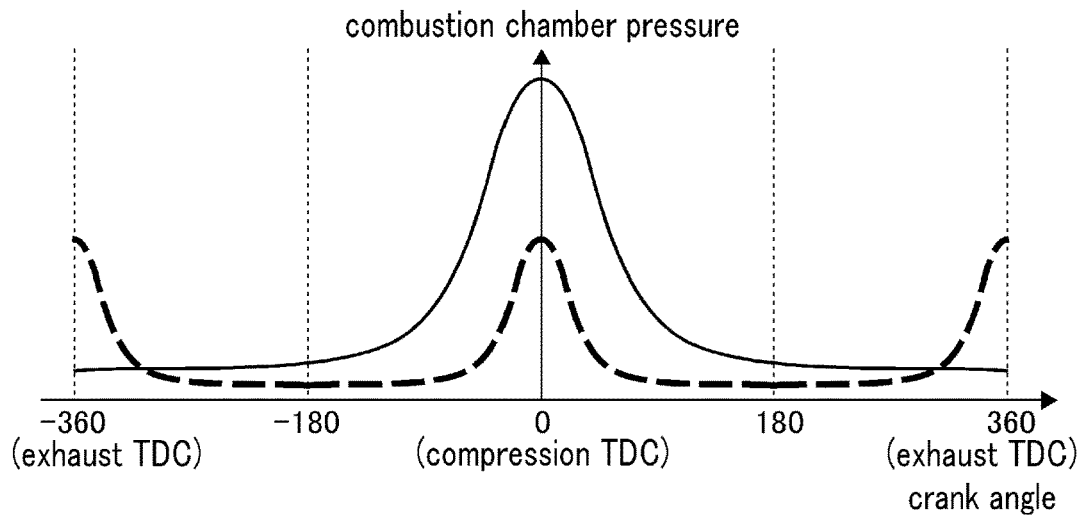
FIG. 6B is graphs for explaining characteristics of the valve lift, combustion chamber pressure, and the ignition discharging time period with respect to crank angles under each valve condition, according to Embodiment 1 of the present invention.
Figure 6C:
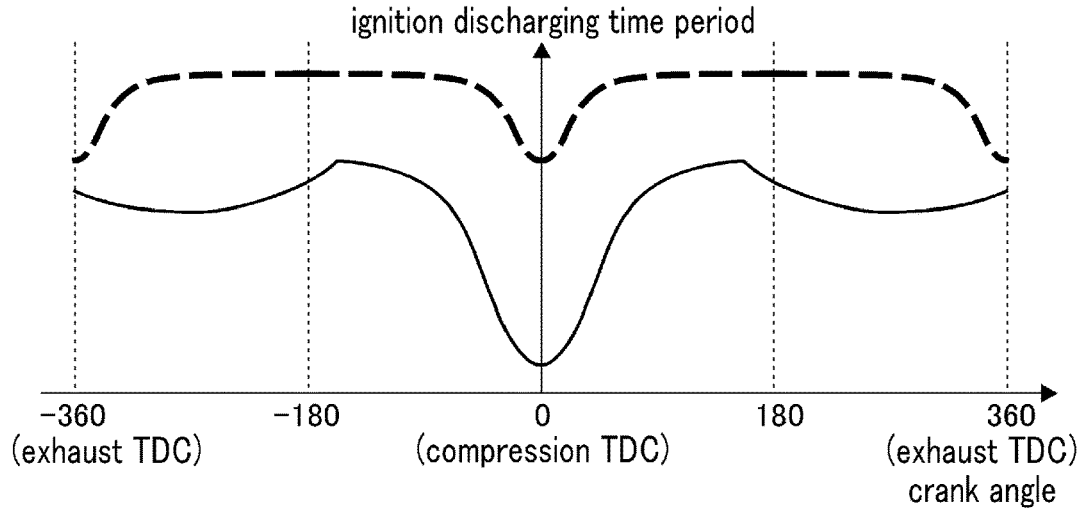
FIG. 6C is graphs for explaining characteristics of the valve lift, combustion chamber pressure, and the ignition discharging time period with respect to crank angles under each valve condition, according to Embodiment 1 of the present invention.

In FIG. 6A to FIG. 6C, the solid lines indicate a situation under an operative condition of the valve and the broken lines, a situation under an inoperative condition thereof. FIGS. 6A, 6B, 6C show valve lifts, combustion chamber pressure, and ignition discharging time periods, respectively, at each crank angle in the situations under the operative and the inoperative conditions of the valve.

Under the operative condition of the valve, a stream is induced by intake and exhaust, and the stream sweeps the ignition discharge between electrodes of the ignition plug. The ignition discharge path stretches longer and sustaining voltage of the ignition discharge becomes higher accordingly to the swept degree of the discharge. Under the inoperative condition of the valve, on the other hand, no stream due to intake and exhaust is induced because the valve lift is always zero (see FIG. 6A). Consequently, the ignition discharge between the electrodes of the ignition plug is not swept. Accordingly, the ignition discharge path remains shorter and sustaining voltage of the ignition discharge becomes lower than those under the operative condition of the valve.

When the same amount of energy is imparted to the ignition plug, the ignition discharging time period until the imparted energy runs out becomes short because the higher the sustaining voltage of the ignition discharge is, the larger the energy is consumed. That is, the ignition discharging time period is shorter under the operative condition of the valve than that under the inoperative condition of the valve (see FIG. 6C).

Under the operative condition of the valve, the combustion chamber pressure becomes maximum at the compression TDC and becomes approximately atmospheric pressure at the exhaust TDC. Under the inoperative condition of the valve, on the other hand, the combustion chamber pressure is substantially the same at the compression TDC and the exhaust TDC, and becomes lower than that under the operative condition of the valves because the gas in the combustion chamber leaks through the gap between the piston and the cylinder liner (see FIG. 6B).

Since breakdown voltage of the ignition plug depends on pressure as is known for Paschen's Law, the higher the combustion chamber pressure is, the higher the breakdown voltage becomes. In addition, when the same amount of energy is imparted to the ignition plug, the ignition discharging time period until the imparted energy runs out becomes short because the higher the sustaining voltage of the ignition discharge is, the larger the energy is consumed. For that reason, under the operative condition of the valve, the ignition discharging time period tends to become shorter around the compression TDC, and under the inoperative condition of the valve, the ignition discharging time period also tends to become shorter around the compression TDC and the exhaust TDC (see FIG. 6C).

By utilizing the characteristics described above, the valve condition can be determined from the ignition discharging time period.

Figure 1:
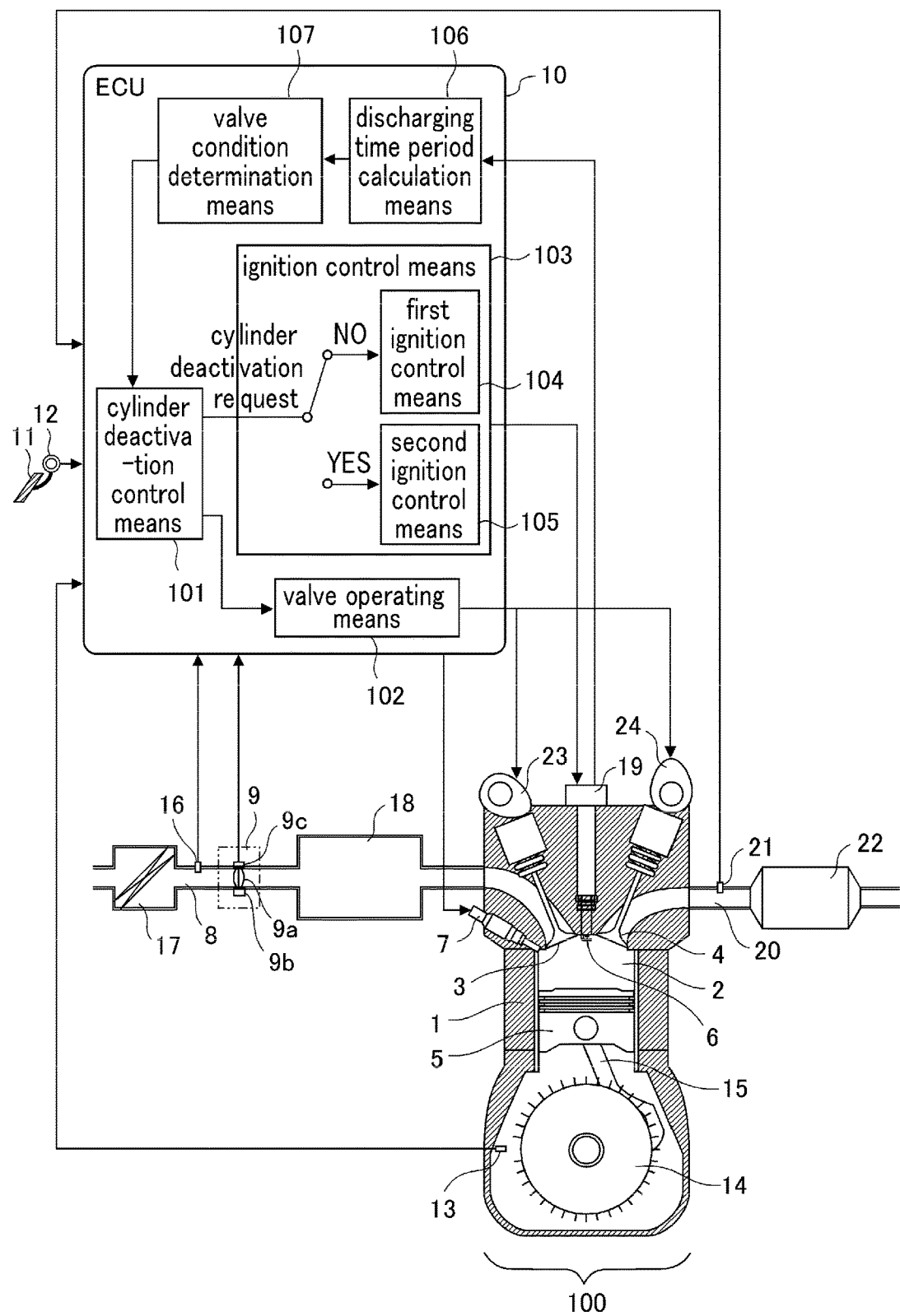
FIG. 1 is a block diagram showing a configuration of an internal combustion engine control apparatus according to Embodiment 1 of the present invention.

Hereinafter, Embodiment 1 of the present invention is described in detail with reference to the accompanying drawings. FIG. 1 is a view schematically showing a configuration of an internal combustion engine pertaining to Embodiment 1 of the present invention and a block diagram showing a configuration of an internal combustion engine control apparatus according to Embodiment 1 of the present invention.

In FIG. 1, a combustion chamber 2 of a cylinder 1 of the internal combustion engine 100 is provided with an intake valve 3, an exhaust valve 4, and a piston 5 and further an ignition plug 6 and an injector 7 are disposed facing toward the inside of the combustion chamber 2.

An intake valve variably actuating part 23 and an exhaust valve variably actuating 24 actuate the intake valve 3 and the exhaust valve 4 to change valve characteristics such as lift amounts and operation angles of the intake valve 3 and the exhaust valve 4, respectively. In Embodiment 1 of the present invention, at least any one of the intake valve 3 and the exhaust valve 4 is put into an operative condition or an inoperative condition (valve lift=0) by a valve operating means 102 in accordance with a request of a cylinder deactivation control means 101.

The piston 5 is connected with a crank shaft 14 through a connecting rod 15. The revolution angle (crank angle) of the crank shaft 14 is detected by a crank angle sensor 13 provided inside the cylinder 1.

The intake airflow fed into the combustion chamber 2 is adjusted by an electrically-controlled throttle 9 provided to an intake passage 8. The electrically-controlled throttle 9 is constituted with a throttle valve 9a, a motor 9b for actuating the throttle valve, and a throttle position sensor 9c for detecting an opened degree of the throttle valve 9a.

An engine control unit (referred to as "ECU" hereinafter) 10 acquires the output signal of an accelerator position sensor 12 for detecting an actuated degree of an accelerator pedal 11 and then sends a control signal to the motor 9b, to control the throttle valve 9a to a proper opening on the basis of a signal indicative of an opened degree of the throttle valve from the throttle position sensor 9c.

Moreover, the ECU 10 acquires output signals from the accelerator position sensor 12, the crank angle sensor 13, an airflow sensor 16, an air-fuel sensor 21, and from various other sensors (not shown), to determine the ignition timing, the amount of fuel to be injected, and the like. Then, the ECU causes, on the basis of these determined values, the injector 7 to inject the fuel into the combustion chamber 2 by driving the injector 7 and causes an ignition control means 103 to energize an ignition coil 19 connected thereto and to discharge sparks across the plug gap of the ignition plug 6.

In Embodiment 1 of the present invention, the cylinder deactivation control means 101 activates or deactivates at least one cylinder of the internal combustion engine, and a first ignition control means 104 performs a first ignition control when no cylinder deactivation request is issued from the cylinder deactivation control means 101 and a second ignition control means 105 performs a second ignition control when the cylinder deactivation request is issued from the cylinder deactivation control means 101. Moreover, in Embodiment 1 of the present invention, the ignition coil 19 has a function of detecting ion current, and the ECU 10 causes a discharging time calculation means 106 to calculate an ignition discharging time period on the basis of an ion-current signal output from the ignition plug 19 when the ignition is performed by the second ignition control means 105. That is, the ignition control methods are switched in response to whether the cylinder is in the deactivation mode or the normal operation mode. While the detail is described later, in the case of detecting a valve condition on the bases of the ignition discharging time period, a timing of starting energization and a timing of finishing energization are calculated so that the ignition coil is energized with constant energy.

Furthermore, the UCU 10 causes a valve condition determination means 107 to determine from the calculated discharging time period whether the valve is in the operative condition or in the inoperative condition, and to output the determination result to the cylinder deactivation control means 101.

The intake air with dust and dirt being removed by an air air cleaner 17 is introduced into a surge tank 18 through the electrically-controlled throttle 9 after its airflow is measured with the airflow sensor 16 and further into the combustion chamber 2 from the surge tank 18 through the intake valve 3. The introduced intake air is mixed with the fuel injected by the injector 7 to form mixture gas, and then the mixture gas is ignited to burn by the spark discharge of the ignition plug 6. Note that according to Embodiment 1 of the present invention, since the fuel injection is stopped for part of cylinders in accordance with the cylinder deactivation request, only spark is discharged without burning.

The combustion pressure of the mixture gas is exerted on the piston 5 to reciprocate it. The reciprocating motion of the piston 5 is transmitted to the crank shaft 14 via the connecting rod 15 to be converted into rotary motion and is transmitted out as output power of the internal combustion engine 100. After the mixture gas is burned, the combustion gas is expelled as exhaust gas into an exhaust passage 20 through the exhaust valve 4. The air-fuel sensor 21 for detecting air-to-fuel ratio of the exhaust gas is provided to the manifold of the exhaust passage 20. A three-way catalytic converter 22 for removing pollutants in the exhaust gas is provided downstream of the manifold of the exhaust passage 20.

Figure 5:
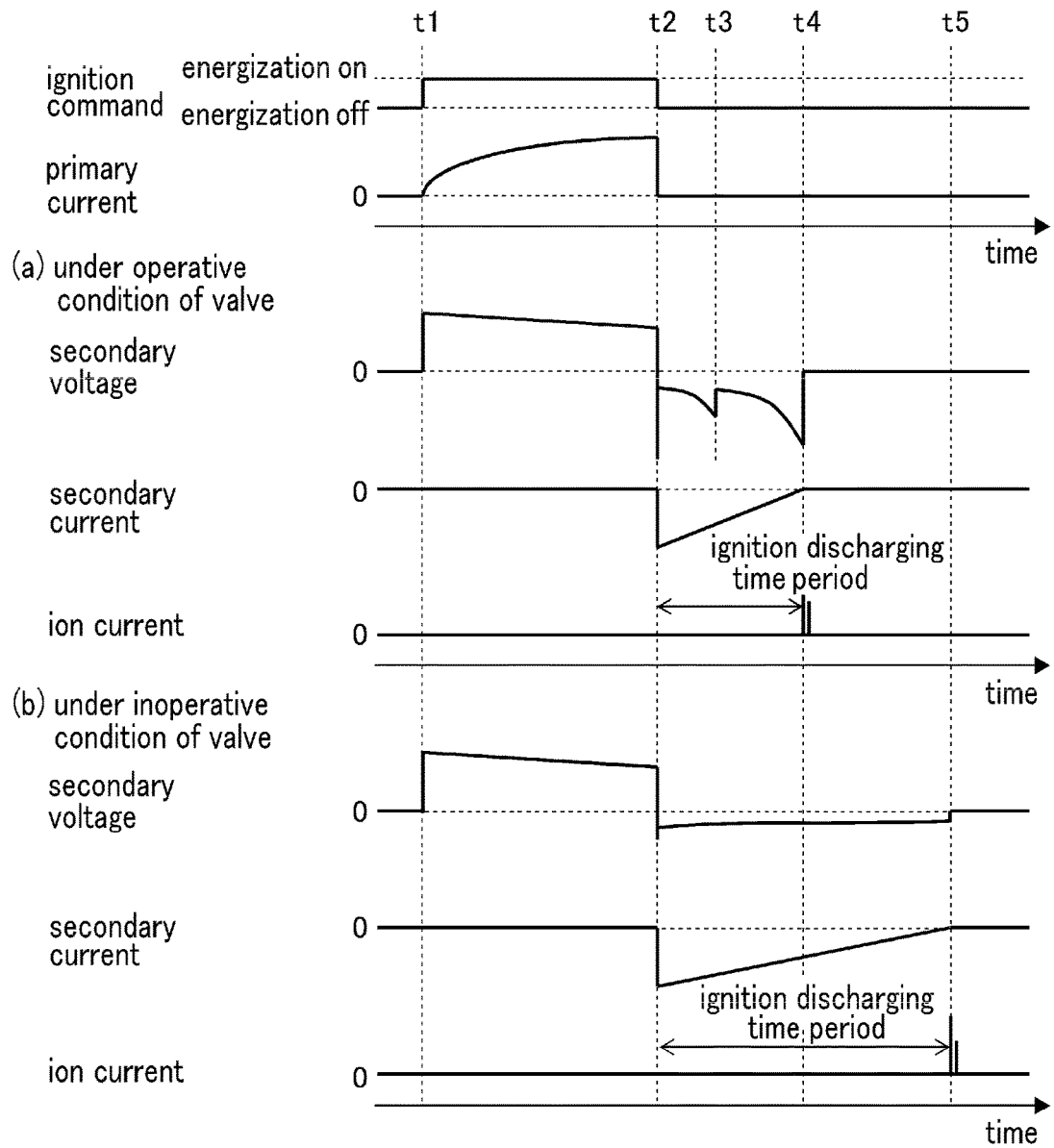
FIG. 5 is timing charts for explaining operation of a valve condition determination means according to Embodiment 1 of the present invention.

Next, in the internal combustion engine control apparatus according to Embodiment 1 of the present invention, its specific operation in determining conditions of the valve is particularly described with reference to the timing charts shown in FIG. 5. The timing chart (a) in FIG. 5 shows behavior of the ignition discharge under the operative condition of the valve, and the timing chart (b) in FIG. 5 shows behavior of the ignition discharge under the inoperative condition of the valve. Here, the horizontal axis denotes time.

First, the ignition control means 103 in the ECU 10 generates an ignition command signal for the ignition coil at least once for each engine cycle, to determine the conditions of the intake valve and the exhaust valve. When the ignition command signal changes from energization off to energization on ($t_1$), energy is stored in ignition coil 19 by a primary current flowing through the primary coil of the ignition coil 19. Then, when the ignition command signal changes from energization on to energization off ($t_2$), a high voltage (secondary voltage) is generated in the secondary coil (after $t_2$) to be applied to a first electrode of the ignition plug 6. On occurrence of a breakdown between the first electrode and the second electrode, an ignition discharge current starts flowing. The ignition discharge is sustained until the stored energy runs out.

As described before, under the operative condition of the valve, the ignition discharge path stretches longer accordingly to the swept degree of the ignition discharge across the ignition plug electrodes by the stream due to intake and exhaust, whereby the secondary voltage (ignition discharge sustaining voltage) becomes high in the negative direction (during the interval between $t_2$ and $t_3$) as shown in the timing chart (a) in FIG. 5. The ignition discharge may sometimes be interrupted ($t_3$) if it stretches too long. In this case, a breakdown occurs once again, whereby the secondary voltage (ignition discharge sustaining voltage) becomes high in the negative direction (during the interval between $t_3$ and $t_4$).

When the stored energy decreases below a level for the ignition discharge current to sustain its ignition discharge, the ignition discharge stops ($t_4$). At this time, the residual energy cannot cause a breakdown again and an LC resonance noise (capacitive current) is generated by the inductance of the secondary coil of the ignition coil 19 and by a floating capacitance and a capacity on the secondary coil side. Since the LC resonance noise dissipates as an ion current, only positive-direction current is detected at the end of the discharge. In addition, the generation of the LC resonance noise continues for about several tens to several hundreds [μsec]. The interval from the energization off ($t_2$) to the detection timing ($t_4$) of the LC resonance noise is the ignition discharging time period under the operative condition of the valve.

Under the inoperative condition of the valve, on the other hand, the valve lift is always zero and no stream due to intake and exhaust is induced and the ignition discharge is substantially subject to no sweep. Accordingly, the ignition discharge path neither stretched nor the ignition discharge sustaining voltage becomes high in the negative direction (during the interval between $t_2$ and $t_5$) as shown in the timing chart (b) in FIG. 5, compared to the situation under the operative condition of the valve. Consequently, the LC resonance noise is detected at the timing $t_5$ delayed from the end timing $t_4$ of the discharge under the operative condition of the valve. The ignition discharging time period under the inoperative condition of the valve is the time period from the energization off timing $t_2$ to the LC resonance noise detection timing $t_5$.

In other words, the valve conditions can be determined by utilizing the fact that the ignition discharging time period $(t_5-t_2)$ under the inoperative condition of the valve is longer than the ignition discharging time period $(t_4-t_2)$ under the operative condition of the valve.

Figure 2:
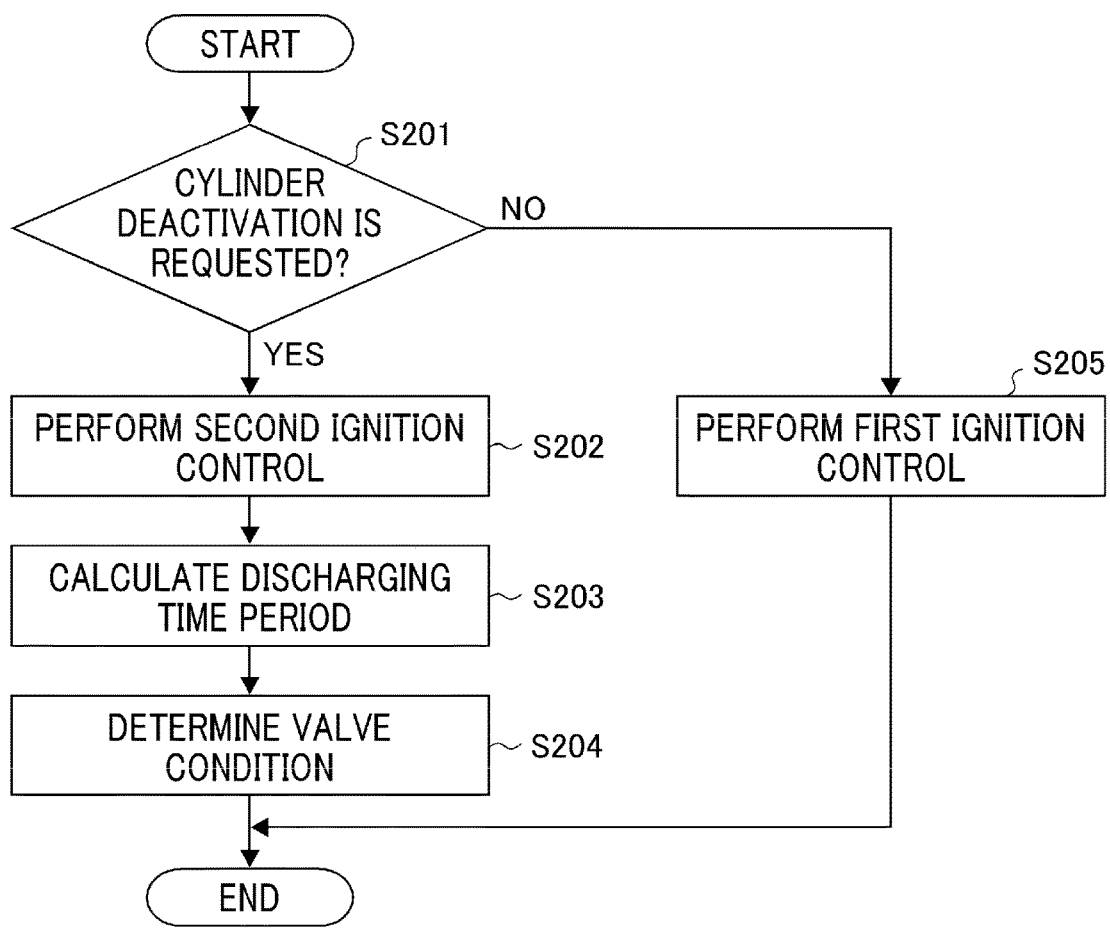
FIG. 2 is a flowchart showing operation of the internal combustion engine control apparatus according to Embodiment 1 of the present invention.

Next, a process of the internal combustion engine control apparatus according to Embodiment 1 of the present invention are described specifically with reference to the flowchart shown in FIG. 2. Note that the process is executed cyclically at predetermined time intervals.

In FIG. 2, a determination is made first of all in Step S201 whether or not the cylinder deactivation request is issued from the above-described cylinder deactivation control means 101. If the cylinder deactivation request is issued ("YES" in Step S201), the process proceeds to Step S202. If no cylinder deactivation request is issued ("NO" in Step S201), the process proceeds to Step S205. The process in the case of "NO" in Step S201 is described first in the following.

In the case of "NO" in Step S201, i.e., in the case of all cylinders are in operation (combustion mode) with no cylinder activation request, the first ignition control is performed by the first ignition control means 104 in Step S205. As described before, in the ordinary ignition control for igniting the mixture gas, the ignition coil is energized on the basis of the ignition timing in order to optimize output performance and combustion efficiency of the internal combustion engine.

Figure 3A:
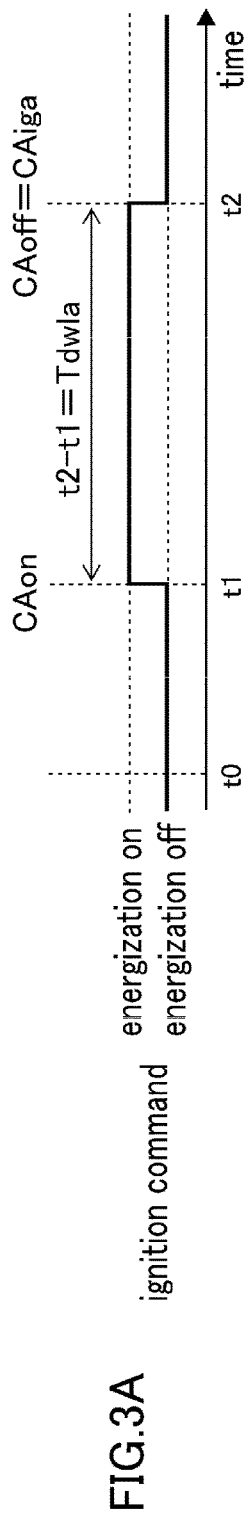
FIG. 3A is timing charts for explaining operation of a first ignition control means of the internal combustion engine control apparatus according to Embodiment 1 of the present invention.
Figure 3B:
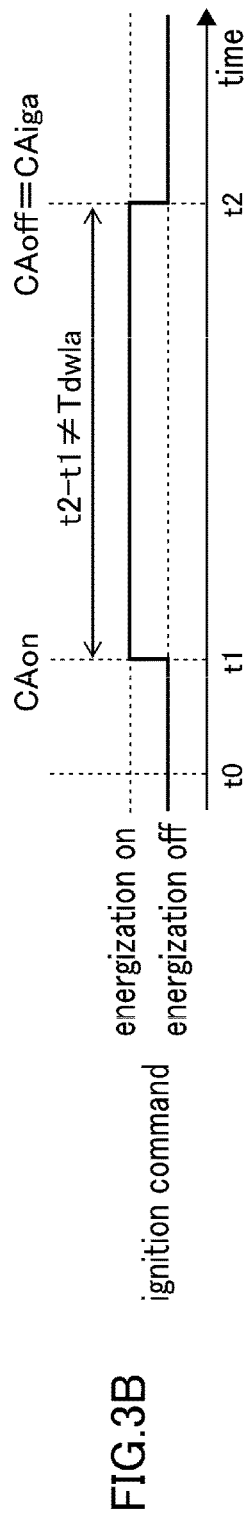
FIG. 3B is timing charts for explaining operation of a first ignition control means of the internal combustion engine control apparatus according to Embodiment 1 of the present invention.
Figure 3C:
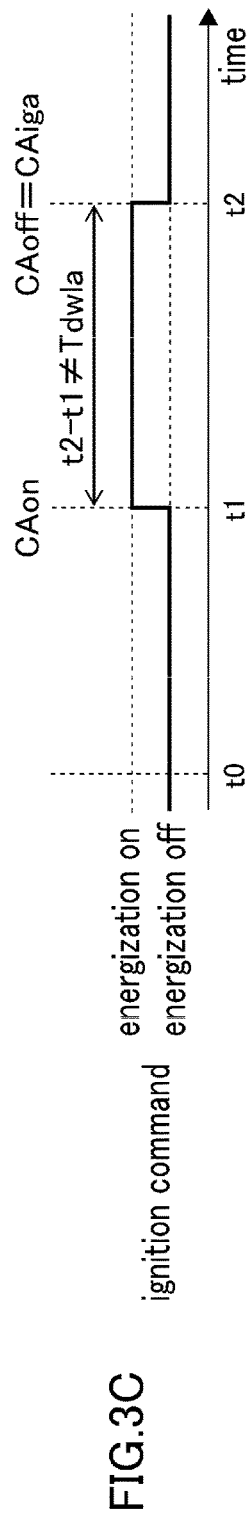
FIG. 3C is timing charts for explaining operation of a first ignition control means of the internal combustion engine control apparatus according to Embodiment 1 of the present invention.

Here, operation of the first ignition control means 104 is described with reference to the timing charts shown in FIG. 3. FIG. 3A shows a case of no variation in the operating condition of the internal combustion engine during the interval between $t_0$ and $t_2$; FIG. 3B shows a case where revolution speed of the internal combustion engine becomes slower during an actual energizing time period between $t_1$ and $t_2$ than that at the timing $t_0$ when a reference revolution speed is calculated; and FIG. 3C shows a case where revolution speed of the internal combustion engine becomes faster during an actual energizing time period between $t_1$ and $t_2$ than that at the timing $t_0$ when the reference revolution speed is calculated. Here, the horizontal axis denotes time.

The first ignition control means 104 acquires an ignition timing $CA_{iga}$ and an energizing time period $T_{dwla}$ at the timing $t_0$, to calculate an elapsed time $T_0$ for a predetermined angle difference $CA_0$. An energization start timing $CA_{on}$ of energizing the ignition coil 19 is calculated at the timing to from these values using the following equation (1). Note that the energization finish timing $CA_{off}$ is the same as the ignition timing $CA_{ig}$.

$$CA_{on}=CA_{iga}+T_{dwla}\times(CA_0/T_0) \quad (1)$$

According to the first ignition control means 104, since the energization finish timing $CA_{off}$ is equal to the ignition timing $CA_{iga}$, the mixture gas can be ignited at a predetermined timing, thus optimizing the output performance and the combustion efficiency. When the operating condition of the engine changes, on the other hand, an actual energizing time period $(t_2-t_1)$ becomes different from the requested energizing time period $T_{dwla}$.

In FIG. 3B, an actual energizing time period $(t_2-t_1)$ is longer than the requested energizing time period $T_{dwla}$ because the revolution speed during the actual energizing time period between $t_1$ and $t_2$ for the ignition coil 19 becomes slower than that at the timing $t_0$ when the reference revolution speed is calculated.

In FIG. 3C, an actual energizing time period $(t_2-t_1)$ is shorter than the requested energizing time period $T_{dwla}$ because the revolution speed during the actual energizing time period between $t_1$ and $t_2$ for the ignition coil 19 becomes faster than that at the timing $t_0$ when the reference revolution speed is calculated.

In this way, since the ignition control means can be switched depending on whether the cylinder deactivation request is issued or not, the ignition can be controlled in response to the object of ignition in each operating condition of the engine.

Moreover, in the case of no cylinder deactivation request, by energizing the ignition coil on the basis of the ignition timing, the energization finish timing is equal to the ignition timing, thus igniting the mixture gas reliably at the predetermined timing.

Referring back to FIG. 2, in the case of "YES" in Step S201, i.e., in the case of deactivating pat of cylinders by the cylinder deactivation request, the second ignition control is performed for the deactivated cylinder by the second ignition control means 105 in Step S202. As described before, in the ignition control for determining the valve condition, the ignition coil 19 is energized so that the energizing time period is constant, i.e., the same energy is imparted to the ignition plug 6.

Here, operation of the second ignition control performed by the second ignition control means 105 is described with reference to the timing charts shown in FIG. 4. FIG. 4A shows a case of no variation in operating condition of the internal combustion engine during the interval between $t_0$ and $t_2$; FIG. 4B shows a case where the revolution speed of the internal combustion engine becomes slower during an actual energizing time period between $t_1$ and $t_2$ than that at the timing $t_0$ when the reference revolution speed is calculated; and FIG. 4C shows a case where the revolution speed of the internal combustion engine becomes faster during an actual energizing time period between $t_1$ and $t_2$ than that at the timing $t_0$ when the reference revolution speed is calculated. Here, the horizontal axis denotes time.

The second ignition control means 105 acquires an ignition timing $CA_{igb}$ and an energizing time period $T_{dwlb}$ at the timing $t_0$, to calculate an elapsed time $T_0$ for a predetermined angle difference $CA_0$. An energization start timing $CA_{on}$ of energizing the ignition coil 19 is calculated at the timing $t_0$ from these values using the forging equation (1). Note that the energization finish timing $CA_{off}$ is defined as a timing after the energizing time period $T_{dwlb}$ elapses from the energization start timing $CA_{on}$.

According to the second ignition control means 105, since the actual energizing time period $(t_2-t_1)$ is equal to the requested energizing time $T_{dwlb}$ even in the case of variation in the revolution speed as shown in FIGS. 4B, and 4C, the same energy is imparted to the ignition plug, so that the valve condition can be determined accurately from the ignition discharging time period. Note that the energization finish timing $CA_{off}$ is different from the ignition timing $CA_{iga}$.

It should be noted here that the energizing time period $T_{dwlb}$ is set shorter by the second ignition control means 105 than the foregoing energizing time period $T_{dwla}$ set by the first ignition control means 104. This reduces the energy imparted to the ignition coil and the ignition plug, thus curbing deterioration of the ignition coil and the ignition plug.

Furthermore, the energizing time period is set on the basis of a predetermined variation range of the revolution speed so that the ignition timing $CA_{igb}$ and the energization finish timing $CA_{off}$ fall within a predetermined range. For example, assuming the revolution speed to be within a variation range of 200 [revs/min], in order for the difference between the ignition timing $CA_{igb}$ and the energization finish timing $CA_{off}$ to be within 3 [deg CA], the energizing time period $T_{dwlb}$ may be set to be 2.5 [msec] or shorter. This enables the ignition to be performed at a predetermined timing even in performing the ignition on the basis of the energizing time period, thus allowing for determining accurately the valve condition on the basis of the characteristics of the ignition discharging time period described above.

Referring back again to FIG. 2, in Step S203, the time period from the energization finish timing to the timing of detecting the LC resonance noise is calculated as the ignition discharging time period, as described above.

In Step S204, determination is made from the ignition discharging time period calculated in Step S203 whether the valve is in the operative condition or the inoperative condition, and then the process is finished.

In this way, by energizing the ignition coil on the basis of the energizing time period when the cylinder deactivation request is issued, the energizing time period for the ignition coil is constant, i.e., the same energy is imparted to the ignition plug irrespective of the operating condition of the internal combustion engine. Therefore, the ignition discharging time period is affected only by the operating condition of the valve, thus allowing for accurate determination of the valve condition.

Moreover, setting the energizing time period to be shorter in performing the ignition for determining the valve condition reduces the energy to be imparted to the ignition coil and the ignition plug, thus curbing deterioration and abrasion of the ignition coil and the ignition plug.

Furthermore, in the case of energizing the ignition coil on the basis of the energizing time period, by setting the energizing time period on the basis of a predetermined variation range of the operating condition of the internal combustion engine so that the ignition timing and the energization finish timing fall within a predetermined range, ignition can be performed at proper timing, thus allows for determining accurately the valve condition.

As has been described above, an internal combustion engine control apparatus according to Embodiment 1 of the present invention energizes, on the basis of an energizing time period, the ignition coil of part of cylinders to be deactivated when cylinder deactivation request is issued. This allows for determining accurately a valve condition from the ignition discharging time period.

The embodiment of the present invention may appropriately modified or omitted within the spirit and scope of the present invention.

What is claimed is:
1. An internal combustion engine control apparatus comprising:
   an electronic control unit (ECU) including at least one processor configured to implement:
   a cylinder deactivation controller which activates or deactivates at least one cylinder of an internal combustion engine;
   a valve operating section which puts at least any one of an intake valve and an exhaust valve provided in the internal combustion engine into an operative condition or an inoperative condition on the basis of a request from the cylinder deactivation controller;
   an ignition controller which energizes an ignition coil provided in the internal combustion engine on the basis of a predetermined ignition timing and a predetermined energizing time period, to cause an ignition plug disposed on a combustion chamber of the internal combustion engine to discharge an ignition spark;
   a discharging time period calculation section which calculates an ignition discharging time period that is a dwell time period of the ignition discharge; and
   a valve condition determination section which determines an operating condition of at least any one of the intake valve and the exhaust valve on the basis of the ignition discharging time period calculated by the discharging time period calculation section, wherein the ignition controller includes a first ignition controller which causes the ignition plug to discharge an ignition spark on the basis of the ignition timing when the cylinder deactivation controller issues no cylinder deactivation request and a second ignition controller which causes the ignition plug to discharge an ignition spark on the basis of the energizing time period when the cylinder deactivation controller issues a cylinder deactivation request.

2. The internal combustion engine control apparatus of claim 1, wherein the first ignition controller calculates at a predetermined timing a timing of starting energization of the ignition coil on the basis of the ignition timing and the energizing time period, and sets also at the predetermined timing a timing of finishing energization of the ignition coil to be the ignition timing.

3. The internal combustion engine control apparatus of claim 1, wherein the second ignition controller calculates at a predetermined timing a timing of starting energization of the ignition coil on the basis of the ignition timing and the energizing time period, and sets also at the predetermined timing a timing of finishing energization of the ignition coil to be a timing delayed for the energizing time period from the timing of starting energization.

4. The internal combustion engine control apparatus of claim 1, wherein the second ignition controller sets the energizing time period to be shorter than that set by the first ignition controller.

5. The internal combustion engine control apparatus of claim 1, wherein the second ignition controller sets the energizing time period such that the timing of finishing energization of the ignition coil is within a predetermined time range with respect to the ignition timing.

6. The internal combustion engine control apparatus of claim 2, wherein the second ignition controller calculates at a predetermined timing a timing of starting energization of the ignition coil on the basis of the ignition timing and the energizing time period, and sets also at the predetermined timing a timing of finishing energization of the ignition coil to be a timing delayed for the energizing time period from the timing of starting energization.

7. The internal combustion engine control apparatus of claim 2, wherein the second ignition controller sets the energizing time period to be shorter than that set by the first ignition controller.

8. The internal combustion engine control apparatus of claim 2, wherein the second ignition controller sets the energizing time period such that the timing of finishing energization of the ignition coil is within a predetermined time range with respect to the ignition timing.

9. The internal combustion engine control apparatus of claim 3, wherein the second ignition controller sets the energizing time period to be shorter than that set by the first ignition controller.

10. The internal combustion engine control apparatus of claim 3, wherein the second ignition controller sets the energizing time period such that the timing of finishing energization of the ignition coil is within a predetermined time range with respect to the ignition timing.

11. The internal combustion engine control apparatus of claim 6, wherein the second ignition controller sets the energizing time period to be shorter than that set by the first ignition controller.

12. The internal combustion engine control apparatus of claim 6, wherein the second ignition controller sets the energizing time period such that the timing of finishing energization of the ignition coil is within a predetermined time range with respect to the ignition timing.

13. The internal combustion engine control apparatus of claim 4, wherein the second ignition controller sets the energizing time period such that the timing of finishing energization of the ignition coil is within a predetermined time range with respect to the ignition timing.

14. The internal combustion engine control apparatus of claim 7, wherein the second ignition controller sets the energizing time period such that the timing of finishing energization of the ignition coil is within a predetermined time range with respect to the ignition timing.

15. The internal combustion engine control apparatus of claim 9, wherein the second ignition controller sets the energizing time period such that the timing of finishing energization of the ignition coil is within a predetermined time range with respect to the ignition timing.

16. The internal combustion engine control apparatus of claim 11, wherein the second ignition controller sets the energizing time period such that the timing of finishing energization of the ignition coil is within a predetermined time range with respect to the ignition timing.

\* \* \* \* \*